United States Patent [19]

Stutz, Jr. et al.

[11] 4,324,014

[45] Apr. 13, 1982

[54] CASSETTE CLEANER

[75] Inventors: William H. Stutz, Jr., Burbank; Joseph Sandor, Reseda, both of Calif.

[73] Assignee: Innovative Computer Products, Tarzana, Calif.

[21] Appl. No.: 134,780

[22] Filed: Mar. 28, 1980

Related U.S. Application Data

[63] Continuation of Ser. No. 962,066, Nov. 20, 1978, abandoned.

[51] Int. Cl.³ .............................................. B08B 11/02
[52] U.S. Cl. ........................................ 15/4; 15/97 R; 15/100; 360/137
[58] Field of Search ................ 15/4, 97 R, 100, 102, 15/308; 360/128, 137

[56] References Cited

U.S. PATENT DOCUMENTS 2,408,438  10/1946  Mills ................................... 15/100
3,019,464   2/1962  Grunwald ........................... 15/100
3,701,178  10/1972  Kuntz ............................... 15/100 X Primary Examiner—Edward L. Roberts

[57] ABSTRACT

This device combines a carbide steel blade, a guide scraper post, and a cleaning pad saturated with solution to clean and condition a magnetic tape cassette. The cleaning pad is a member of a disposable pad strip containing a plurality of individual cleaning pads such that a fresh cleaning pad may be used for each cleaning application. A rotary dispensing valve delivers a predetermined amount of cleaning solution to the individual pad at the commencement of each cleaning cycle. Operation of the cleaning machine is initiated by depressing a starting lever which indexes the pad strip and dispenses cleaning solution from the rotary valve to the cleaning pad, while moving the scraping blade and cleaning pad into a position to contact the tape. Pushing of a run button then starts the tape drive system.

18 Claims, 7 Drawing Figures

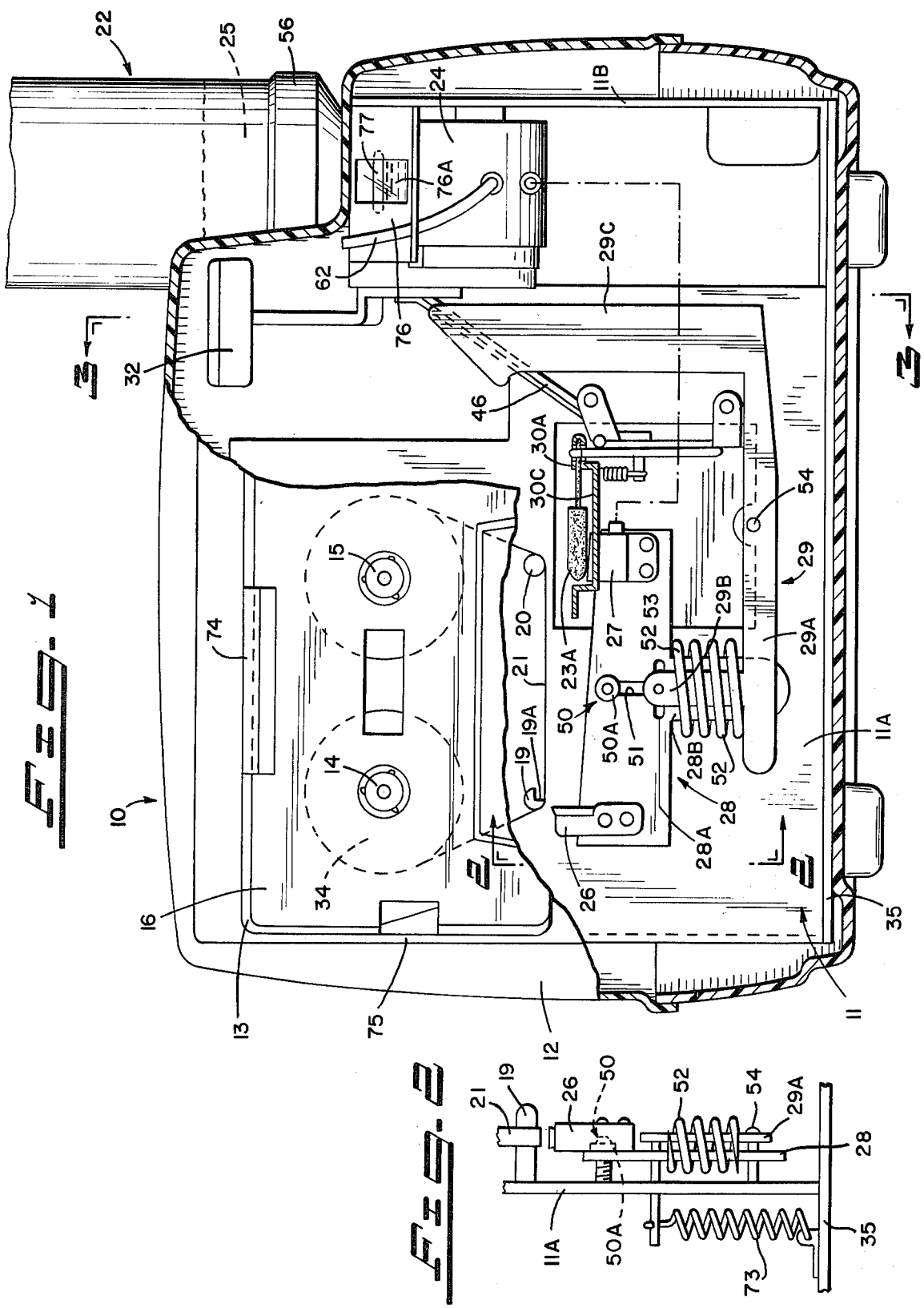

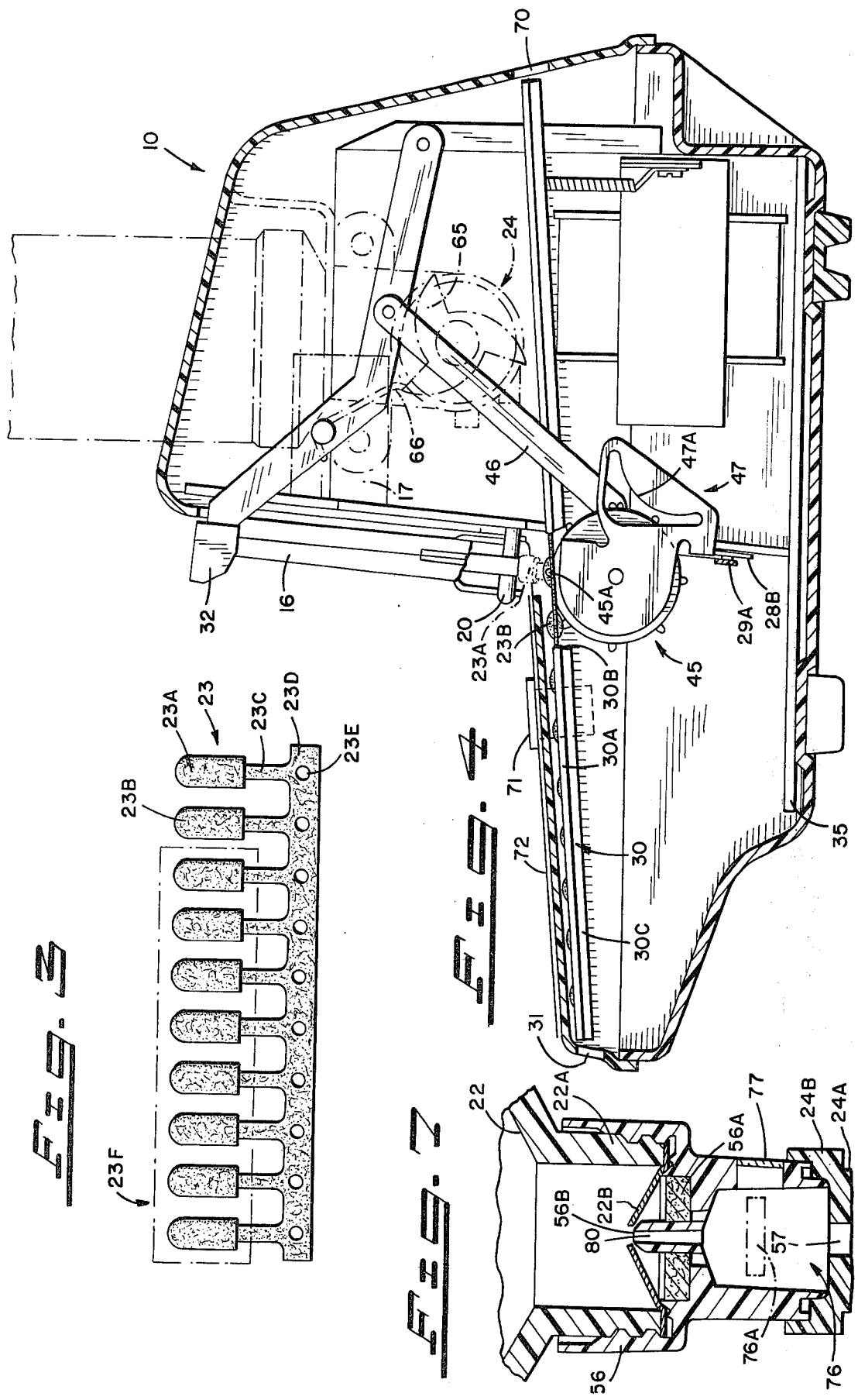

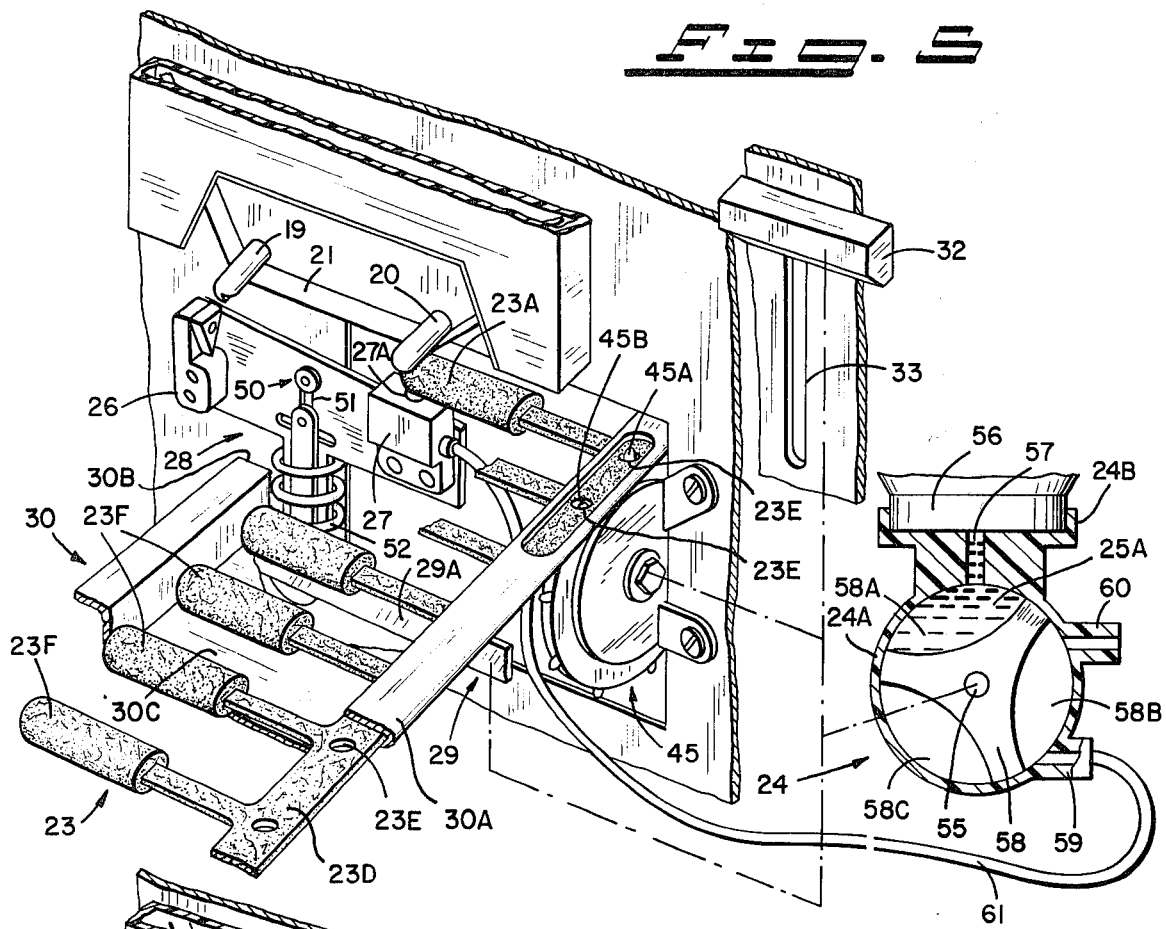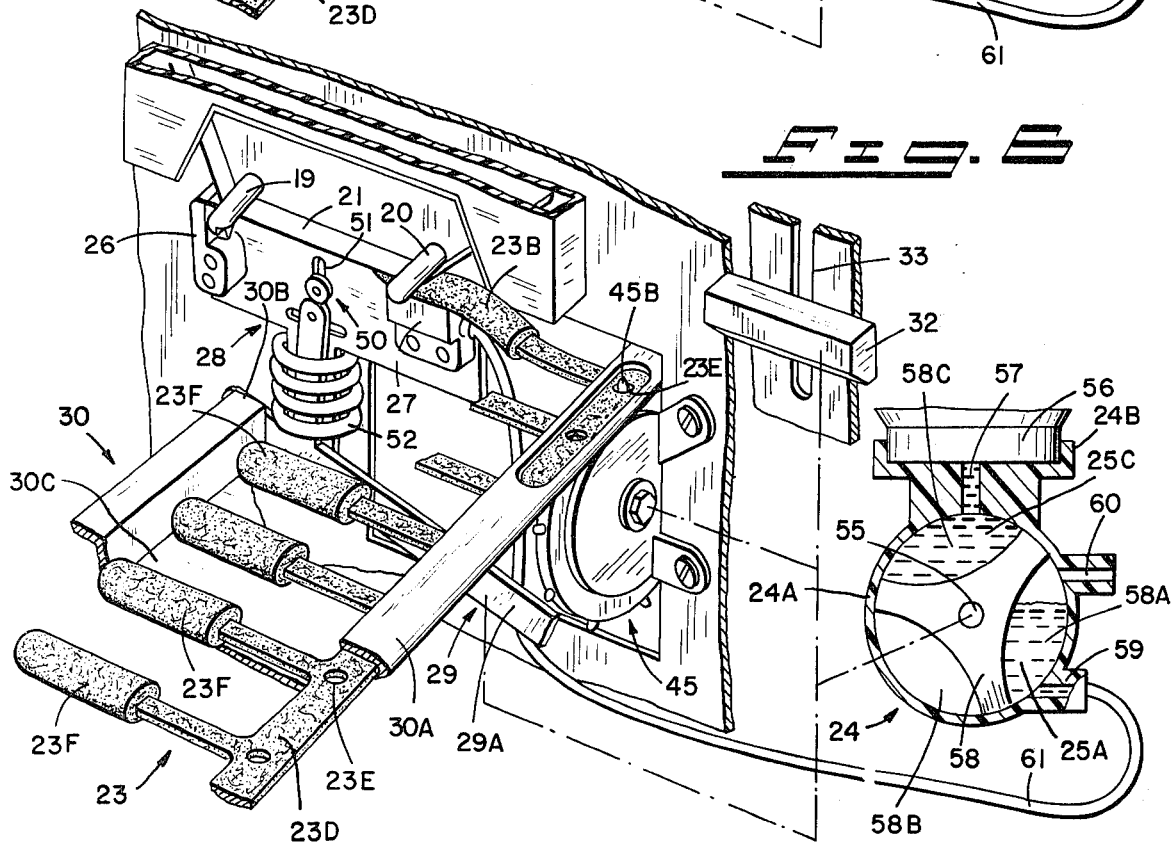

CASSETTE CLEANER

This is a continuation of application Ser. No. 962,066, filed Nov. 20, 1978, now abandoned.

BACKGROUND

1. Field of the Invention

The present invention relates to a machine used to automatically clean and condition magnetic tape cassettes.

2. Prior Art

Magnetic tape cassettes enjoy widespread use in the audio, video, and digital computer areas. The magnetic tape used in these areas is essentially the same, being comprised of polyester plastic coated with iron oxide which is capable of being magnetized and de-magnetized. With each use of a magnetic tape cassette contamination build-up occurs. At some point dirt particles on the tape surface can bring about sufficient head to tape separation to cause intermittent signal loss. This problem is especially detrimental to digital computer applications where data is not properly transferred from the tape resulting in inefficient computer operation.

Prior art has not developed an efficient, easy to operate, low cost device for cleaning magnetic tape cassettes. The majority of tape cleaners on the market today are for use with the larger ½" magnetic tape mounted on an individual reel. The conventional cleaning techniques employed by these devices include a wiper tissue, scraping grids, vacuum, or some sort of tape blade or scraping technique.

It is a principal object of the present invention to provide an economical magnetic tape cassette cleaning machine that uses both a pad saturated with solution and a blade to remove oils and surface particles of all sizes from the front side of the tape. In connection with this objective, and pad should be fabricated of a material sufficient to uniformly spread the solution on the tape, while trapping any contaminants on the surface. The blade action should be capable of removing both the non-evaporated solution, and the dissolved contaminants suspended in the solution. A related objective is to provide a scraping surface that removes contaminants from the back side of the tape, so as not to re-contaminate the front side of the tape when rewound onto the cassette spindle.

Another objective of the present invention is to provide a fresh cleaning pad for each cleaning cycle, such that each cleaning pad used is free from accumulated oil or contaminants which could reduce its cleaning effectiveness.

It is an objective of the present invention to provide a means whereby a predetermined amount of cleaning solution is automatically delivered to the pad at the commencement of each cleaning cycle.

A further objective of this invention is to provide a tape cleaning machine that requires only the actuation of a lever and the pushing of a button, with no subsequent operator intervention required during the cleaning cycle.

SUMMARY OF THE INVENTION

These and other objectives are achieved by the inventive apparatus which combines a pad saturated in solution, a scraping blade, and a guide scraper post to perform the cleaning function. The cleaning pad is part of a disposable multi-pad strip that includes a plurality of individual cleaning pads, each mounted on a flexible finger extending from a common base. The multi-pad strip base contains a perforation aligned with each finger such that a driving sprocket indexes the strip to provide a fresh pad for each cleaning application.

A predetermined amount of cleaning solution is delivered to the pad at the initiation of each cleaning cycle. This is accomplished by a multi-chambered dispensing valve capable of rotation, so as to expose a previously filled chamber to a dump port while simultaneously exposing a separate, empty chamber to a fluid storage compartment.

The fluid is delivered from the dispensing valve to the cleaning pad through a metering block that regulates the flow rate to the pad. The metering block and cleaning blade are mounted on a movable member that positions the metering block against the individual pad, and the blade and pad against the magnetic tape during the cleaning cycle.

In operation the machine first requires the movement of a main lever. This activates the initiation sequence whereby the multi-pad strip is indexed and cleaning solution is dispensed from the rotary valve to the cleaning pad, while the scraping blade and cleaning pad are being positioned to contact the tape. Momentary actuation of a run button then starts the tape drive motor. The cleaning cycle lasts until the entire tape has been cleaned, at which time the drive motor automatically shuts off.

BRIEF DESCRIPTION OF THE DRAWINGS

A detailed description of the invention will be made with reference to the accompanying drawings wherein:

FIG. 1 is a front view of the inventive tape cleaner with the housing broken away to expose the tape cleaning mechanism, which is shown in the disengaged condition.

FIG. 2 is a side elevational view of the movable support plate of the inventive cleaner taken along the line 2—2 of FIG. 1, showing its interaction with the slide bellcrank arm and retractor spring, with the components in the disengaged condition.

FIG. 3 is a plan view of a disposable multi-pad strip.

FIG. 4 is side-sectional view of the tape cleaner of FIG. 1 as seen along the line 3—3 of FIG. 1.

FIG. 5 is a diagrammatic illustration of the scraping blade, cleaning pad, and rotary dispensing valve components of the cleaner of FIG. 1, with the components in the disengaged condition.

FIG. 6 is diagrammatic illustration of the scraping blade, cleaning pad, and rotary dispensing valve components of the cleaner of FIG. 1, with the components engaged in the cleaning operation.

FIG. 7 is an enlarged, fragmentary sectional view of the cylindrical fluid container receptacle, with the inverted container positioned therein.

DETAILED DESCRIPTION

Referring to FIG. 1, the cassette cleaning machine 10 includes a main chassis 11 surrounded by a large plastic housing 12. A cassette mounting plate 13 is affixed to the upper left-hand corner of the main chassis 11, having two outstanding spindles 14 and 15 for mounting of a magnetic tape cassette 16. A motor 17 (see FIG. 4) is coupled to each spindle 14 and 15 on the back of the chassis 11. Two tape guide posts 19 and 20 are located below the respective spindles 14 and 15 with the left guide post 19 having a recess 19A so as to create a sharp scraping edge that is used to scrape contaminants from the back of the tape 21.

The inventive cleaning machine 10 utilizes a replacable container of cleaning solution 22, and a disposable pad strip 23 having a plurality of individual cleaning pads 23A, 23B and 23F. A dispensing valve 24 affixed to the main chassis 11 and coupled to the fluid storage compartment 76, is used to deliver cleaning solution 25 from the container 22 to an individual cleaning pad 23B.

A scraping blade 26 and a metering block 27 are coupled to a movable support plate 28 affixed to the main chassis 11 (FIGS. 1 and 2). A slide bellcrank arm 29 moves the support plate 28 vertically along the main chassis 11.

In the preferred embodiment of the inventive tape cleaning machine, a tape cassette 16 is placed on the mounting spindles 14 and 15 and is held in place by the retaining clips 74 and 75. A multi-pad strip 23 is inserted into the pad tray 30 (FIGS. 5 and 6) through a slot 31 (FIG. 4) in the machine housing 12. A container of cleaning solution 22 is affixed to the fluid storage compartment 76.

Activation of the initiation sequence of the cassette cleaning machine 10 is accomplished by use of the main lever 32. When the inventive machine 10 is not engaged in the cleaning operation as shown in FIG. 5, the main lever 32 resides at the top of the main lever slot 33. As illustrated in FIG. 6, depression of the main lever 32 in the slot 33 to the position shown starts the sequence, whereby the multi-pad strip 23 is indexed to position a fresh cleaning pad 23B for the cleaning cycle, the dispensing valve 24 delivers cleaning solution to the metering block 27 which regulates the flow rate to the cleaning pad 23B, and throughout the main lever 32 travel the sliding support plate 28 is moved up the main chassis 11 to position the scraping blade 26 and the cleaning pad 23B to contact the tape 21. Depressing the run button 71 (FIG. 4) initiates the drive motor 17 connected to the left spindle 14. The tape 21 is run over the cleaning pad 23B and the scraping blade 26, and is taken up onto the left reel 34. After the entire tape is cleaned, the drive motor automatically shuts off.

When the main lever 32 is lifted back up in the slot 33 the reverse sequence only disengages the cleaning components from the cassette 16, without indexing the pad strip 23 or moving the dispensing valve 24.

FIG. 1 shows the inventive cleaning machine 10 with the outer housing 12 substantially broken away. The main chassis 11 is L-shaped and upstands essentially perpendicular from a horizontal base plate 35, although tilted slightly backwards. The front panel 11A of the chassis 11 is positioned approximately in the middle of the base plate 35 and runs its entire width. The metal cassette receiving plate 13 is postioned in the upper lefthand corner of the front panel 11A. The receiving plate 13 is rectangular in shape being of the same general dimensions as a conventional magnetic tape cassette 16.

Each spindle 14 and 15 on the receiving plate 13 is coupled to a motor 17 affixed to the back side of the front panel 11A. A drive motor is coupled to spindle 14, and a generator is coupled to spindle 15. The drive system is activated by means of a run button 71 that sits on a partially transparent panel 72 on the outer housing 12 (FIG. 4). The button 71 requires only a momentary depression to start the drive system. The drive system starts out slowly and then increases speed, so as not to put excessive strain on the tape 21 which might stretch or damage it. Output from the generator is used to control power to the drive motor so as to maintain constant tension on the tape 21, thereby providing for proper winding of the tape 21 onto the take-up reel 34. At the end of the tape 21, output from the generator ceases, thereby cutting power to the drive motor.

For rewinding the tape 21, the cassette 16 is merely flipped over on its other side before mounting on the spindles. Pushing of the run button 71 then performs the rewind operation.

As shown in FIGS. 1 and 5, the machine 10 is not engaged in the cleaning operation, and the first individual cleaning pad 23A is positioned directly below the right guide post 20. This individual cleaning pad is part of the disposable multi-pad strip 23 shown in FIG. 3. The multi-pad strip 23 consists of separate cleaning pads 23A, 23B and 23F, 23A referring to the first pad, 23B referring to the second pad, and 23F referring to any of the subsequent pads. Each cleaning pad is fabricated from an opencell polyurethane foam. The foam has a preferred density of about 100 cells/inch so that each cell is large enough to hold the solution 25, but small enough to trap tiny contaminants. The pads are mounted on a plurality of flexible fingers 23C extending from a common base strip 23D, said fingers arranged in spaced alignment along the base strip 23D. The base strip 23D contains a perforation 23E adjacent to each finger extension 23C, that is used for indexing the multi-pad strip 23.

The multi-pad strip 23 rides in the pad tray 30 that runs the entire depth of the cleaning machine 10. The multi-pad strip 23 exits the pad tray 30 through a slot 70 (FIG. 4) in the rear of the machine housing 12. The pad tray 30 is essentially perpendicular to the plane of the front panel 11A, although tilted slightly downward (FIG. 4). The pad tray 30 extends through an opening in the front panel 11A at a height sufficient to position the cleaning pad 23A directly below, and in a near contact with, the right guide post 20. The pad tray 30 contains a U-shaped channel 30A (FIG. 5) in which the common base 23D of the multi-pad strip 23 rides. The tray 30 also contains an opening 30B (FIG. 4) in its bottom 30C at that point where it passes through the front panel 11A to allow the metering block 27 to ascend up through the tray bottom 30C and come in contact with the tape-aligned individual cleaning pad 23A.

Indexing of the multi-pad strip 23 is accomplished by sprocket wheel 45 (shown in FIGS. 4 through 6), and a sprocket indexing arm 46 (FIG. 4). The ball detented pad indexing sprocket wheel 45 is located beneath the pad tray 30, such that the sprocket wheel main plane is generally perpendicular to the tray bottom 30C. The sprocket wheel 45 is at such a height with respect to the pad tray 30, that the sprocket 45A (FIG. 4) in the twelve o'clock position passes through the tray bottom opening 30B and engages the pad strip perforation 23E adjacent to the tape-aligned cleaning pad 23A A transparent panel 72 in the outer housing 12 is situated directly above the pad tray 30 (see FIG. 4). This allows the user to view the indexing of the multi-pad strip 23, and to keep track of how many individual pads 23F have been used.

The movement of the sprocket wheel 45 and the multi-pad strip 23 for the indexing operation is illustrated in FIGS. 5 and 6. Where the cleaning machine 10 is not engaged in the cleaning operation (FIG. 5), the individual pad 23A is below the right guide post 20, with the sprocket 45A protruding through the perforation 23E which is aligned with the cleaning pad 23A. This positioning indicates that the cleaning pad 23A was used in the prior cleaning cycle. When the main lever 32 is depressed to activate the initiation sequence, the sprocket indexing arm 46, coupled to the main lever 32 (FIG. 4), drives the sprocket wheel 45 in a clockwise rotation (as viewed in FIG. 4). The sprocket 45A forces the multi-pad strip 23 forward. The following sprocket 45B on the pad indexing sprocket wheel 45 slides into the perforation 23E aligned with the new cleaning pad 23B (FIG. 6). The sprocket wheel 45 engages that section of the pad strip 23 so as to place the next adjacent cleaning pad 23B in position below the right guide post 20 (FIG. 6). When the cleaning operation is complete the operator is required to lift the main lever 32 which causes the sprocket indexing arm 46 to ratchet back into position for the next indexing sequence.

FIGS. 1, 2, 5 and 6 show the sliding support plate 28 that is used to position the individual cleaning pad 23B and scraping blade 26 to contact the tape during the cleaning cycle. The sliding support plate 28 is T-shaped and is affixed to the front panel 11A by means of a guide pin 50 (FIGS. 1 and 2) with a flanged head 50A. The guide pin 50 is positioned through a small vertical slot 51 located in the center of the horizontal member 28A of the support plate 28. This allows for free vertical movement of the support plate 28 over the length of the slot 51 while still remaining in contact with the front panel 11A. A coupling spring 52 encircles the vertical member 28B of the support plate 28 and the vertical flange 29B of the slide bellcrank arm 29. This serves to spring load the support plate 28 into position for cleaning and compensate for tolerance accumulation in the parts. A retractor spring 73 facilitates return of the support plate 28 to its disengaged position.

The sliding support plate 28 is hinged to the L-shaped slide bellcrank arm 29 which pivots about a pin 54 through the front panel 11A. This slide bellcrank arm 29 is controlled by the main lever 32 which interacts with the vertical member 29C of the bellcrank arm 29 to move the sliding support plate 28 in a vertical direction along the front panel 11A. As seen in FIG. 5, when the main lever 32 is positioned at the top of the main lever slot 33, the horizontal member 29A of the slide bellcrank arm 29 is essentially parallel to the base plate 35 (FIG. 1 and FIG. 5) positioning the sliding support plate 28 a spaced distance below the tape. When the main lever 32 is depressed in the main lever slot 33 (FIG. 6), the slide bellcrank arm 29 rotates about its pivot pin 54 forcing the support plate 28 up the front panel 11A, so as to position the metering block 27 against the cleaning pad 23B, and the cleaning pad 23B and scraping blade 26 to contact the tape 21 during the cleaning cycle.

The metering block 27, located on the right end of the horizontal member 28A of the sliding support plate 28 contains a small through opening 27A as shown in FIG. 5. This small opening 27A is sized to permit the solution 25 to slowly seep out and be absorbed into the cleaning pad 23B, insuring a uniform dispersion of the solution 25 to the tape during the entire cleaning cycle.

As illustrated in FIGS. 5 and 6, a predetermined amount of cleaning solution 25 is delivered to the metering block 27 from the dispensing valve 24 affixed to the chassis side panel 11B (FIG. 1). As shown in FIG. 6 the dispensing valve 24 is cylindrical in shape, with its axis 55 situated perpendicular to the plane of the side panel 11B (FIG. 1).

As shown in FIGS. 1 and 7 a cylindrical receptacle 56 is mounted atop the dispensing valve 24 and is surrounded by a sealing lip 24B that is part of the valve housing 24A. The receptacle 56 accepts the inverted container 22 of cleaning fluid 25, and holds an amount of fluid 25 in a storage compartment 76 for subsequent delivery to the dispensing valve 24. Referring to FIG. 7 the cylindrical receptacle 56 is threaded to accept and hold the threaded mouth 22A of the container 22. The mouth 22A of the container 22 is initially covered with foil 22B. At the center of the receptacle 56 is an upstanding drain port 80 that is sharp-edged to provide piercing points for penetrating the foil cover 22B. The receptacle 56 also contains a foam filter ring 56A that includes an additional surface 56B for piercing the foil cover 22B.

Fluid 25 flows from the container 22 through the filter 56A into the fluid storage compartment 76. The fluid storage compartment 76 opens at its bottom into a fill port 57 in the dispensing valve housing 24A which permits subsequent dispersal of fluid to the dispensing valve 24. The fluid storage compartment 76 is also a fluid level gauge such that the user can monitor the amount of fluid remaining. When a float 76A approaches the bottom of the compartment 76, it becomes visible through a clear window 77 in the sidewall of receptacle 56, giving the user notice that a new bottle 22 of solution 25 should be added.

The dispensing valve 24 houses a multi-chambered cylinder 58 as shown in FIGS. 5 and 6. The multi-chambered cylinder 58 is totally enclosed by, coaxial with, and runs the depth of, the cylindrical housing 24A of the dispensing valve 24. The multichambered cylinder 58 has an outer diameter equal to the inner diameter of the cylindrical valve housing 24A, and rotates so as to expose one empty chamber 58C to the fluid storage compartment 76 while simultaneously exposing the previously filled chamber 58A to the dump port 59. The dump port 59 and the vent port 60 are positioned circumferentially on the side of the cylindrical valve housing 24A such that both ports are exposed simultaneously to one and the same chamber, that chamber being the one dispensing previously stored cleaning fluid 25A to the metering block 27. Dump tubing 61 runs from the dump port 59 to the through opening 27A of the metering block 27, and the vent port 60 is exposed to the ambient air by the vent tubing 62 (see FIG. 1). This facilitates a smooth, steady discharge of fluid to the metering block 27. It also fills the emptied chamber with a volume of air so that when the chamber comes around to be filled with fluid 25, a volume of air is delivered to the container 22 that is equal to the volume of fluid 25 taken out. This rotary valve design allows for dispensing from a closed (non-vented) container so that the total system is not subject to fluid leakage or evaporation.

The multi-chambered cylinder 58 is rotated by means of a three-pronged rachet 65 as shown in FIG. 4. This rachet 65 is affixed to the clyinder 58, on the axis 55 of the dispensing valve 24 at the valve end not affixed to the chassis panel 11B. The rachet 65 is actuated by the spring pawl 66 attached to the main lever 32. Referring to FIG. 5, when the main lever 32 is positioned at the top of the main lever slot 33 the empty chamber 58B of the dispensing valve 24 is exposed to the dump and vent ports, 59 and 60 respectively. Cleaning fluid 25A for use in the subsequent cycle is stored in chamber 58A which remains exposed to the fluid storage compartment 76.

When the main lever 32 is depressed, the spring pawl 66 forces the rachet 65 to rotate the multi-chambered cylinder 58 in a clockwise direction as viewed in FIGS. 5 and 6. Referring to FIG. 6, this rotation exposes the previously filled chamber 58A to the dump port 59 and vent port 60. The chamber 58A disperses the cleaning fluid 25A to the metering block 27 through the dump port tubing 61, while the previously empty chamber 58C receives cleaning fluid 25C from the fluid storage compartment 76.

While a preferred system has been described, it should be clear that the disclosed cassette cleaner may be modified in many respects while still retaining the essential features and advantages of the system. Accordingly, the scope of the invention is defined, not by the disclosed embodiment, rather by the following claims.

What is claimed:

1. An apparatus using a cleaning pad for cleaning magnetic tape carried in a tape cassette, comprising:
   a main frame having means for supporting a cassette;
   A cleaning head movably mounted with respect to said main frame to enable a cleaning pad to engage the tape in the cassette;
   a drive system, coupled to the cassette when the cassette is in a fixed relationship with the frame, for moving tape in the cassette past said cleaning head;
   a source of cleaning fluid;
   a cleaning blade mounted on said cleaning head for scraping engagement with the tape; and
   cleaning pad metering means for supplying cleaning fluid from said source to a cleaning pad during cleaning of said tape, said cleaning pad metering means including a cleaning fluid dispensing valve, said valve supplying a predetermined amount of said cleaning fluid to said cleaning pad via said metering means each time that said cleaning head is forced into cleaning engagement with the tape.

2. A cleaning apparatus according to claim 1, wherein said valve comprises a first chamber means for receiving cleaning fluid from said source for use in a subsequent cleaning operation and a second chamber means for supplying cleaning fluid to said metering means for the current cleaning operation.

3. A cleaning apparatus according to claim 1, wherein said dispensing valve comprises:
   a multi-chambered cylinder enclosed within a valve housing;
   means for rotating said cylinder so as to expose one empty chamber to a fill port communicating from said source of cleaning fluid while simultaneously exposing a previosuly filled chamber to a dump port communicating to said metering means.

4. The apparatus of claim 1 wherein said cleaning pad metering means is located on said cleaning head and forces a cleaning pad into cleaning engagement with the tape.

5. An apparatus using a cleaning pad for cleaning magnetic tape carried in a tape cassette, comprising:
   a cleaning pad, wherein said cleaning pad is a component of a disposable member having multiple cleaning pads;
   a main frame having means for supporting a cassette;
   a cleaning head movably mounted with respect to said main frame to enable said cleaning pad to engage the tape in the cassette;
   a drive system, coupled to the cassette when the cassette is in a fixed relationship with the frame, for moving tape in the cassette past said cleaning head;
   a source of cleaning fluid;
   a cleaning blade mounted on said cleaning head for scraping engagement with the tape;
   cleaning pad metering means for supplying cleaning fluid from said source to said cleaning pad during cleaning of said tape; and
   positioning means for positioning one of said cleaning pads between said cleaning head and said tape.

6. A cleaning apparatus according to claim 5 wherein said disposable multi-pad member comprises plural separate cleaning pads respectively mounted on a like plurality of flexible extensions emanating from a common base.

7. A cleaning apparatus according to claim 6 which further comprises a starting mechanism coupled to said cleaning head, actuation of said starting mechanism causing said cleaning head to be moved into cleaning engagement with the tape.

8. A cleaning apparatus according to claim 7 wherein said starting mechanism is coupled to said positioning means so that actuation of said starting mechanism causes a new cleaning pad to be positioned between said cleaning head and the tape at the initiation of the cleaning cycle.

9. An apparatus for use with a cleaning pad for cleaning magnetic tape carried in a tape cassette, comprising:
   a main frame having means for supporting a cassette wherein said supporting means includes a pair of spindles rotatably attached to said main frame and spaced to receive a cassette;
   a cleaning head movable mounted with respect to said main frame to enable a cleaning pad to engage the tape in the cassette;
   a drive system, coupled to the cassette when the cassette is in a fixed relationship with the frame, for moving tape in the cassette past said cleaning head, wherein said drive system includes a motor connected to rotate one of said spindles so as to drive said magnetic tape in said cassette past said cleaning head;
   a source of cleaning fluid;
   a cleaning blade mounted on said cleaning head for scraping engagement with the tape;
   cleaning pad metering means for supplying cleaning fluid from said source to a cleaning pad during cleaning of said tape; and
   a pair of posts for guiding said tape, said cleaning blade being mounted on the opposite side of said tape from one of said guide posts, wherein a cleaning pad when in cleaning position is situated on the opposite side of said tape from the other of said guide posts, so that when said cleaning head is moved into cleaning engagement said blade will urge said tape against said one guide post and said cleaning head will urge said pad against said tape and said tape against said other guide post.

10. A cleaning apparatus according to claim 9 wherein said one guide post is recessed to form a shoulder having a sharp edge which engages and scrapes the side of the tape opposite that which is scraped by said cleaning blade.

11. A cleaning apparatus according to claim 9 in combination with a cleaning pad, wherein said cleaning pad is contained in a disposable multi-pad member having a plurality of cleaning pads disposed respectively at the ends of a like plurality of flexible fingers extending in mutually spaced relationship from a common base strip, said apparatus having guide chute means for receiving said multi-pad member and advancing one of said cleaning pads into position between said cleaning head and said tape.

12. A cleaning apparatus according to claim 11 wherein said cleaning head comprises a plate slidably mounted to said main frame, said apparatus further comprising a starting lever on said main frame and coupled to said guide chute means, to said plate and to said source of cleaning fluid, whereby actuation of said lever (a) advances a new cleaning pad into position, (b) slides said plate so as to bring said cleaning head into engagement with said tape, and (c) causes said source to supply cleaning fluid via said metering means to said pad.

13. An apparatus for cleaning material in the shape of an elongated tape, and adapted to use a multi-pad strip of the type having separate cleaning pads mounted on a plurality of flexible fingers emanating from a common base, said apparatus comprising:
    a main frame;
    a multi-pad strip holding member mounted to said main frame;
    an indexing means supported by said main frame, for engaging the base of a multi-pad strip held by said holding member; and
    starting means, supported by said main frame and coupled to said indexing means, for initiating the cleaning of tape by said apparatus, actuation of said starting means causing said indexing means to advance a strip held by said holding member so as to position a new cleaning pad into operative contact with the tape to be cleaned.

14. A cleaning apparatus according to claim 13, wherein said base is perforated and wherein said indexing means comprises a sprocket member having teeth arranged to engage the perforations on said multi-pad strip base.

15. A cleaning apparatus according to claim 13 wherein said starting means comprises a manually operable lever and wherein said indexing means comprises a sprocket wheel coupled to said lever for rotation through a new pad-positioning angle upon manual operation of said lever.

16. A cleaning apparatus according to claim 15 further comprising:
    a metering block member moved by said lever from a rest position to an engaged position pressing said new cleaning pad into operative contact with said tape to be cleaned, and
    cleaning fluid source means for providing a flow of cleaning fluid to said block upon actuation of said starting means, said block having an orifice therein for metering said provided cleaning fluid to said pad during cleaning of said tape.

17. An apparatus for use with a cleaning pad for cleaning magnetic tape carried in a tape cassette comprising:
    a main frame having means for supporting a cassette;
    a cleaning head movably mounted with respect to said main frame to enable a cleaning pad when positioned on the cleaning head to engage the tape in the cassette;
    a drive system, coupled to the cassette when the cassette is in a fixed relationship with the frame, for moving tape in the cassette past said cleaning head;
    a source of cleaning fluid;
    a cleaning blade mounted on said cleaning head for scraping engagement with the tape;
    cleaning pad metering means for supplying cleaning fluid from said source to a cleaning pad during cleaning of said tape; and
    positioning means for replacing a used cleaning pad with a fresh cleaning pad between cassette cleaning operations.

18. An apparatus for cleaning magnetic tape carried in a tape cassette, comprising:
    a main frame having means for supporting a cassette;
    a cleaning head movably mounted with respect to the main frame;
    a drive system, coupled to the cassette when the cassette is fixed with respect to the frame, for moving tape in the cassette past the cleaning head;
    a cleaning pad saturated with cleaning solution and mounted to move in conjunction with the movement of the cleaning head;
    a cleaning blade mounted to move in conjunction with the cleaning head, wherein said cleaning head, pad and blade are movable so as to force the cleaning pad and cleaning blade into contact with the tape in the cassette; and
    positioning means for replacing said cleaning pad with a fresh cleaning pad between cassette cleaning operations.

* * * * *